United States Patent [19]
Kimura et al.

[11] 3,935,536
[45] Jan. 27, 1976

[54] GHOST SIGNAL CANCELLATION SYSTEM

[75] Inventors: Takeji Kimura, Hirakata; Tomio Oyama, Toyonaka; Haruyasu Yamada, Kadoma; Shuzi Harada, Matsubara; Hirokazu Yoshino, Katano; Eiichi Tsuboka, Nara, all of Japan

[73] Assignee: Matsushita Electric Industrial Co., Ltd., Osaka, Japan

[22] Filed: Mar. 14, 1973

[21] Appl. No.: 341,121

[30] Foreign Application Priority Data

| Mar. 16, 1972 | Japan | 47-27184 |
| Mar. 23, 1972 | Japan | 47-29483 |
| Apr. 18, 1972 | Japan | 47-39275 |
| Apr. 18, 1972 | Japan | 47-39276 |
| Apr. 18, 1972 | Japan | 47-39277 |
| Apr. 18, 1972 | Japan | 47-39278 |
| May 6, 1972 | Japan | 47-44792 |
| June 3, 1972 | Japan | 47-55300 |
| June 3, 1972 | Japan | 47-55301 |
| June 7, 1972 | Japan | 47-57124 |

[52] U.S. Cl. ......... 325/476; 178/DIG. 44; 328/163
[51] Int. Cl.² .................... H04B 1/10; H04N 5/44
[58] Field of Search ............ 178/5, 6, 7.3 R, 7.5 R, 178/DIG. 4, DIG. 12, DIG. 15, DIG. 44; 325/65, 304, 473, 474, 475, 476; 328/162, 163, 164, 165; 330/149

[56] References Cited
UNITED STATES PATENTS

| 2,227,057 | 12/1940 | Blumein | 250/20 |
| 3,356,947 | 12/1967 | Di Toro | 328/162 |
| 3,537,008 | 10/1970 | Lakatos | 325/65 |
| 3,580,991 | 5/1971 | Krause | 358/8 |
| 3,763,314 | 10/1973 | Murakami | 178/7.3 R |

FOREIGN PATENTS OR APPLICATIONS

| 631,960 | 11/1949 | United Kingdom | 325/476 |
| 523,434 | 7/1940 | United Kingdom | |

*Primary Examiner*—George H. Libman
*Assistant Examiner*—George G. Stellar
*Attorney, Agent, or Firm*—Stevens, Davis, Miller & Mosher

[57] ABSTRACT

A ghost signal cancellation system for cancelling ghost signals caused, for example, by reflection in a transmission line of television signals transmitted from a television transmitting station. This system is particularly suited for incorporation in a television receiver to improve the picture quality of a reproduced picture.

5 Claims, 59 Drawing Figures

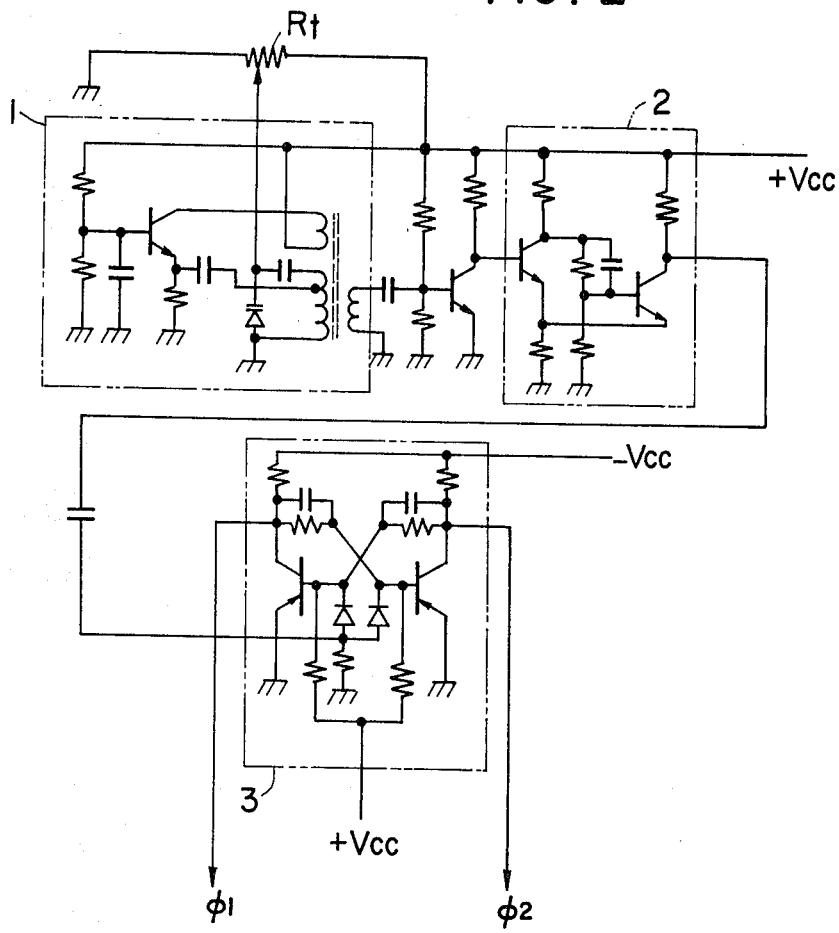
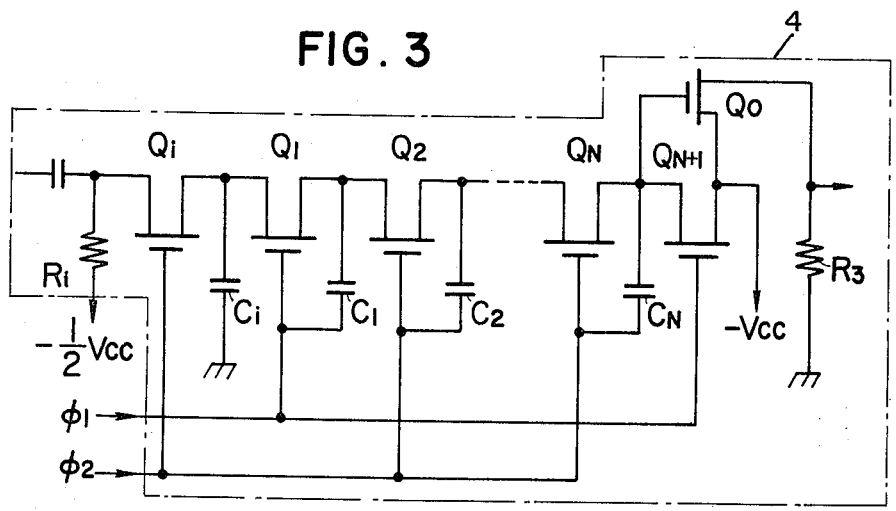

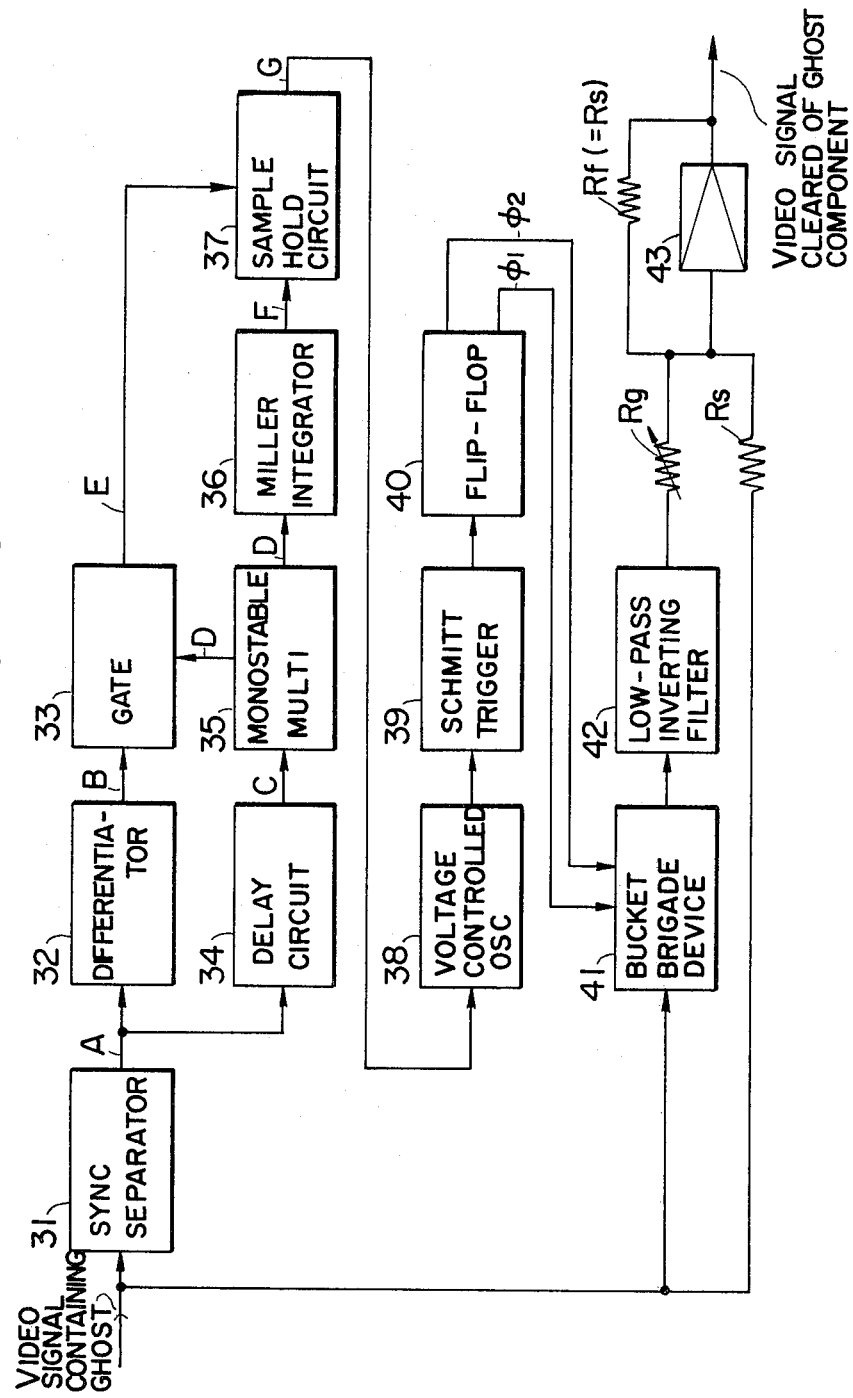

0.5μS

↓v

↓v

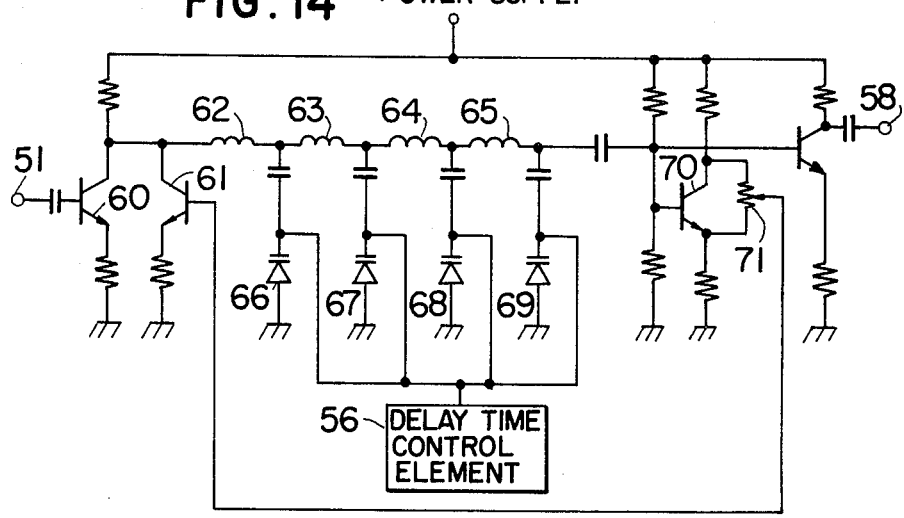

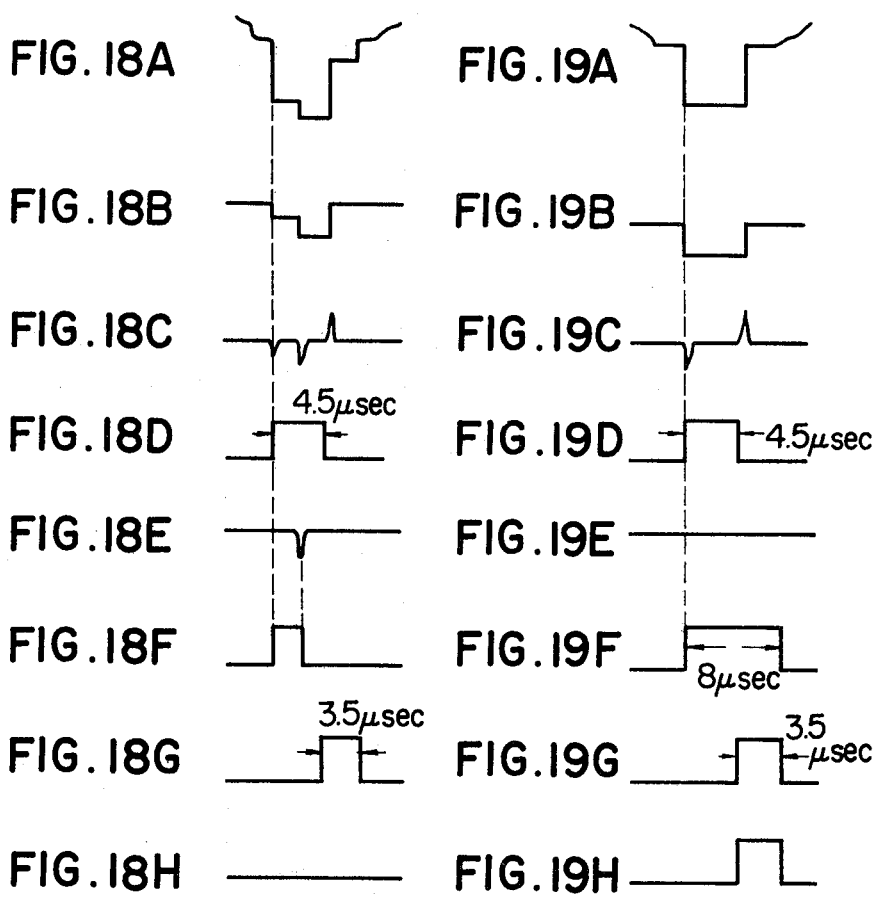

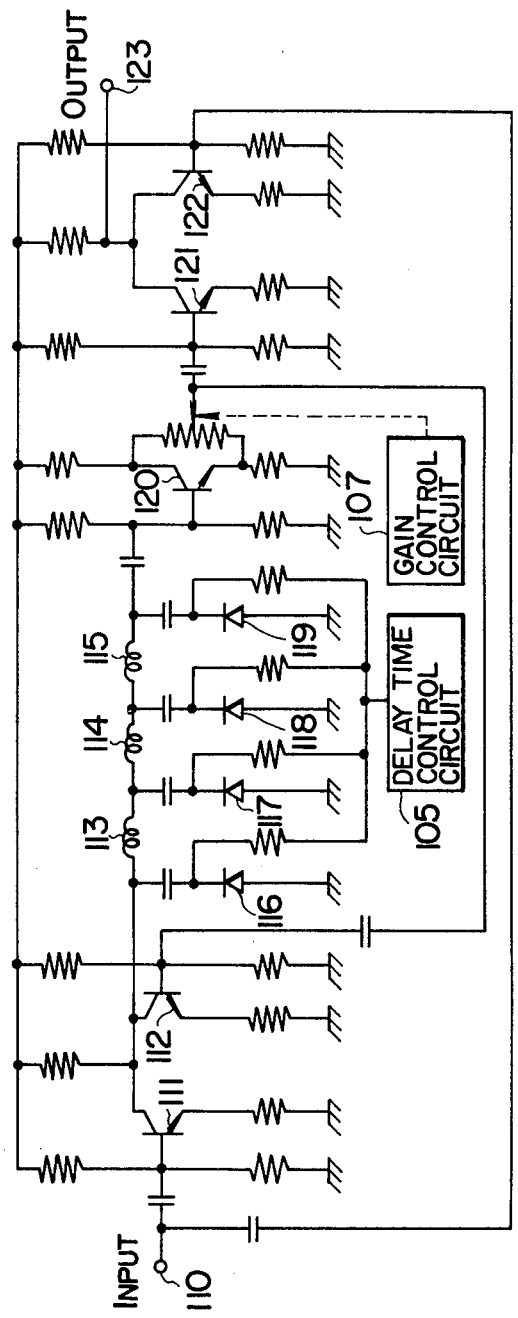

GHOST SIGNAL CANCELLATION SYSTEM

The present invention relates generally to ghost signal cancellation systems and more particularly to a ghost signal cancellation system suitable for use in a television receiver.

Generally, when a television signal wave, for example, is reflected by an obstruction or the like and the reflected wave is received and superimposed on a radiated wave directly arriving at the receiving antenna, a duplicate image of the reproduced picture appears on the screen of the cathode ray tube of a television receiver at a place displaced from the original image by a distance corresponding to a delay of several $\mu$ sec. This reflected wave component is called a ghost signal and two, three or more images may be produced to the side of the original image as the number of reflected waves increases.

It is an object of the present invention to provide a ghost signal cancellation system capable of cancelling out such ghost signals.

It is another object of the present invention to provide a ghost signal cancellation system capable of automatically detecting and cancelling out such ghost signals.

It is a further object of the present invention to provide a ghost signal cancellation system, wherein in view of the fact that one ghost signal cancellation adjustment is enough if the transmitting and receiving stations are fixed, a manual adjustement is utilized in place of an automatic adjustment, thereby making the construction of the system simpler.

In accordance with the present invention, a ghost signal cancellation system is provided which is relatively simple in construction and which may be conveniently incorporated in a television receiver to produce reproduced pictures of good quality.

Other objects and advantages of the present invention will become readily apparent from considering the following detailed description in conjunction with the accompanying drawings, in which:

FIGS. 2, 3 and 4 are circuit diagrams showing respectively specific circuit constructions of the principal component parts of FIG. 1;

FIG. 9 is a block diagram of a still further embodiment of the system according to the invention;

FIG. 14 is a specific circuit diagram for the principal part of the embodiment shown in FIG. 12;

FIGS. 18A to 18H and FIGS. 19A to 19H are signal waveforms diagrams for the detector of FIG. 17;

FIG. 22 is a circuit diagram showing the detailed circuit construction of the principal part of the embodiment shown in FIG. 20;

Figure 1:
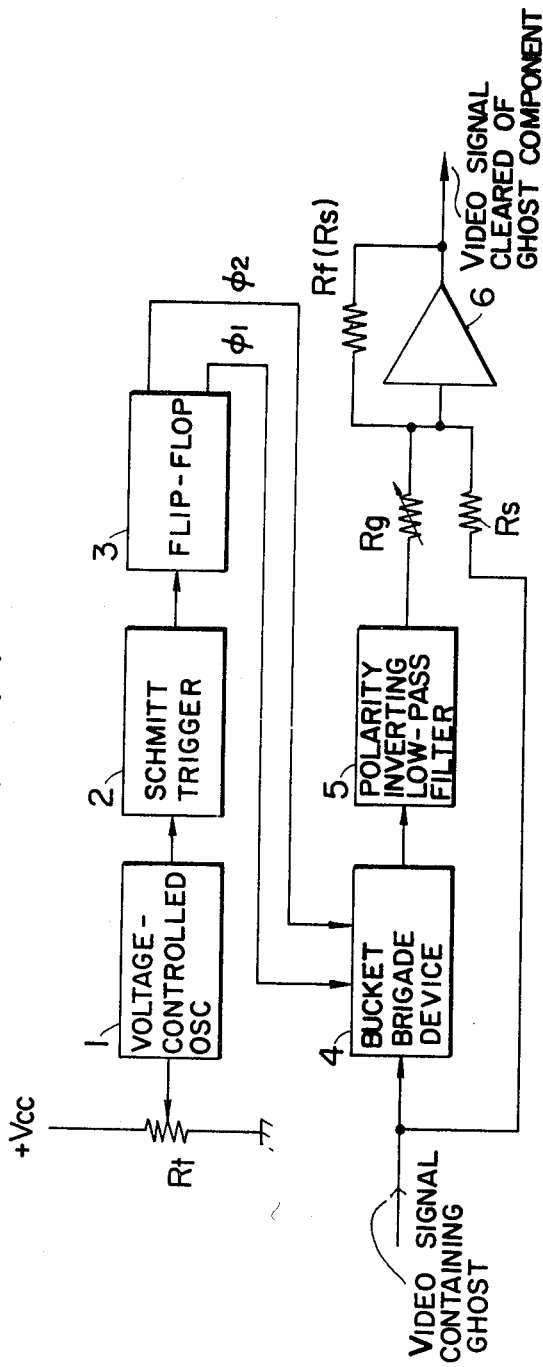
FIG. 1 is a block diagram showing a first embodiment of a ghost signal cancellation system according to the present invention.
Figure 5:
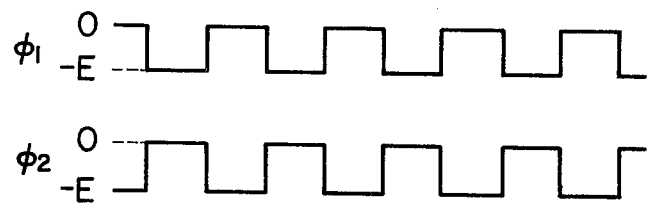
FIG. 5 is a waveform diagram of the driving signals for the bucket brigade device.

The present invention will now be explained with reference to FIG. 1 illustrating an embodiment of the invention. In the figure, numeral 1 designates a voltage-controlled oscillator whose frequency of oscillation is variable depending on the adjustment of a variable resistor $R_t$. Numeral 2 designates a Schmitt trigger circuit for reshaping the output of the oscillator 1 into a rectangular wave form. Numeral 3 designates a flip-flop circuit which receives the output of the Schmitt trigger circuit 2 and produces clock pulses $\phi_1$ and $\phi_2$ in two phases as shown in FIG. 5. Numeral 4 designates a Bucket brigade device actuated by the two-phase clock pulses $\phi_1$ and $\phi_2$ and adapted to act as a variable delay device whose delay is variable depending on the repetition frequency of the two-phase clocks. Numeral 5 designates a low-pass inverting filter for effecting the polarity reversal and the removal of unnecessary high frequency components, and numeral 6 designates an operational amplifier externally provided with a variable resistor $R_g$ and resistors $R_s$ and $R_f$ to perform analogically the operation of addition on the output of the low-pass inverting filter 5 and an original video signal containing a ghost.

Figure 4:
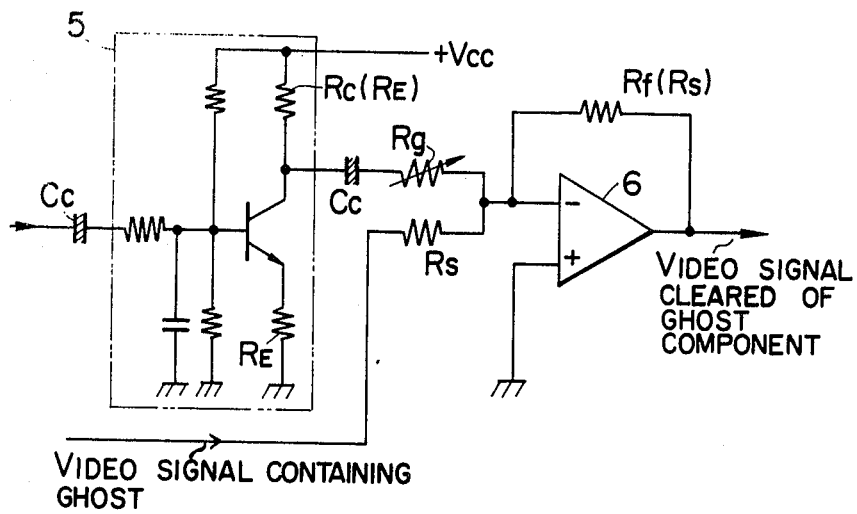

FIGS. 2 through 4 are detailed circuit diagrams for the embodiment of FIG. 1. In FIG. 2, there are shown specific circuit constructions of the oscillator 1, the Schmitt trigger circuit 2 and the flip-flop circuit 3.

FIG. 3 illustrates one form of the circuit construction of the bucket brigade device 4 as a clock-controlled semiconductor delay device. While, in this embodiment, the bucket brigade device has been used, a charge coupled device may also be employed.

FIG. 4 illustrates a circuit construction of the low-pass polarity-inverter filter 5 and the operational amplifier 6. In the figure, $C_c$ designates a coupling capacitor and $R_E$ and $R_c$ designate respectively the emitter resistor and collector resistor of a phase inverter transistor.

The operation of the first embodiment is as follows: A negative video signal containing a ghost is applied to the bucket brigade device 4 where it is sampled by a transistor $Q_i$ and a clock pulse $\phi_2$ and then stored in a capacitor $C_i$ in FIG. 3. This voltage is then transmitted by a clock pulse $\phi_1$ to a capacitor $C_1$ through a transistor $Q_1$ and in like manner the voltage is successively transmitted by clock pulses $\phi_1$ and $\phi_2$ to capacitors $C_2$, ....., and $C_N$. The information thus stored in the capacitor $C_N$ is delivered through an output transistor $Q_o$. In this case, the delay time $t_d$ of the signal is determined by the number N of the transistor-capacitor pairs and the repetition frequency $f$ of the clock pulses and it is given by the following expression:

$$t_d = N/2f$$

Consequently, if the value of the repetition frequency $f$ is selected greater than twice the value of the maximum frequency $f_{max}$ in the frequency band of the video signal and if the value of $f$ is changed within the limits which satisfies the condition of $f \geq 2f_{max}$, the delay time $t_d$ can be changed correspondingly. In this way, the delay time $t_d$ is selected to correspond with the delay time of the ghost. The clock pulses used consist of pulses obtained by reshaping the AC output of the voltage-controlled oscillator 1 by the Schmitt trigger circuit 2 and the flip-flop 3. While, in this embodiment, the voltage for controlling the oscillation frequency of the oscillator 1 has been produced by dividing a voltage $V_{cc}$ by the variable resistor $R_t$, the delay time of the ghost may be automatically detected to thereby produce the required control voltage. Further, all that is essential with the circuits 1 to 3 is to provide clock pulses having a desired repetition frequency and therefore many other modifications may also be used. For instance, it is possible to use a control method in which the oscillation frequency of the oscillator is controlled by an electrical quantity other than voltage, e.g., a current value.

Now, since the output of the bucket brigade device 4 is one which has been sampled at the repetition frequency $f$ as previously explained, it is necessary to connect the output terminal of the bucket brigade device 4 to a low-pass filter whose cut-off frequency falls between the values of $f$ and $f_{max}$, so that the original signal is restored, its polarity is reversed and it is then subjected to the operation of subtraction in an analog adder. Such filtering and polarity reversal are effected by the low-pass inverting filter 5.

The output of this filter 5 is applied through the variable resistor $R_g$ to the operational amplifier 6 where it is added to the video signal containing the ghost component, which is applied to the amplifier 6 through the resistor $R_s$. Assuming now that the intensity of the ghost component with respect to the principal signal in the original video signal containing the ghost is given as $1/g$, that the values of $R_g$ and $R_s$ are selected so that $R_s/R_g = 1/g$ and that the feedback resistor $R_f$ is selected so that $R_f = R_s$, then the video signal whose ghost component has been approximately removed is produced at the output of the operational amplifier 6.

In this case, since the video signal applied to the bucket brigade device contains the ghost, the final output will produce a weak ghost of negative polarity at a position delayed by 2 $t_d$. However, since the intensity of this ghost is $1/g^2$, if $1/g \leq 1/3$, then we obtain $1/g^2 \leq 1/9$. Therefore such a ghost is practically unnoticeable to the eye and it does not cause any inconvenience in practical use.

While, in this embodiment, a bucket brigade device has been employed for the clock-controlled delay device 4, other clock-controlled type delay devices may also be employed. Further, while a variable resistor has been employed for hte element $R_g$, other methods may also be utilized in which the ghost component ratio $1/g$ of the original signal is for example detected to automatically adjust so that $R_s/R_g = 1/g$.

Figure 6:
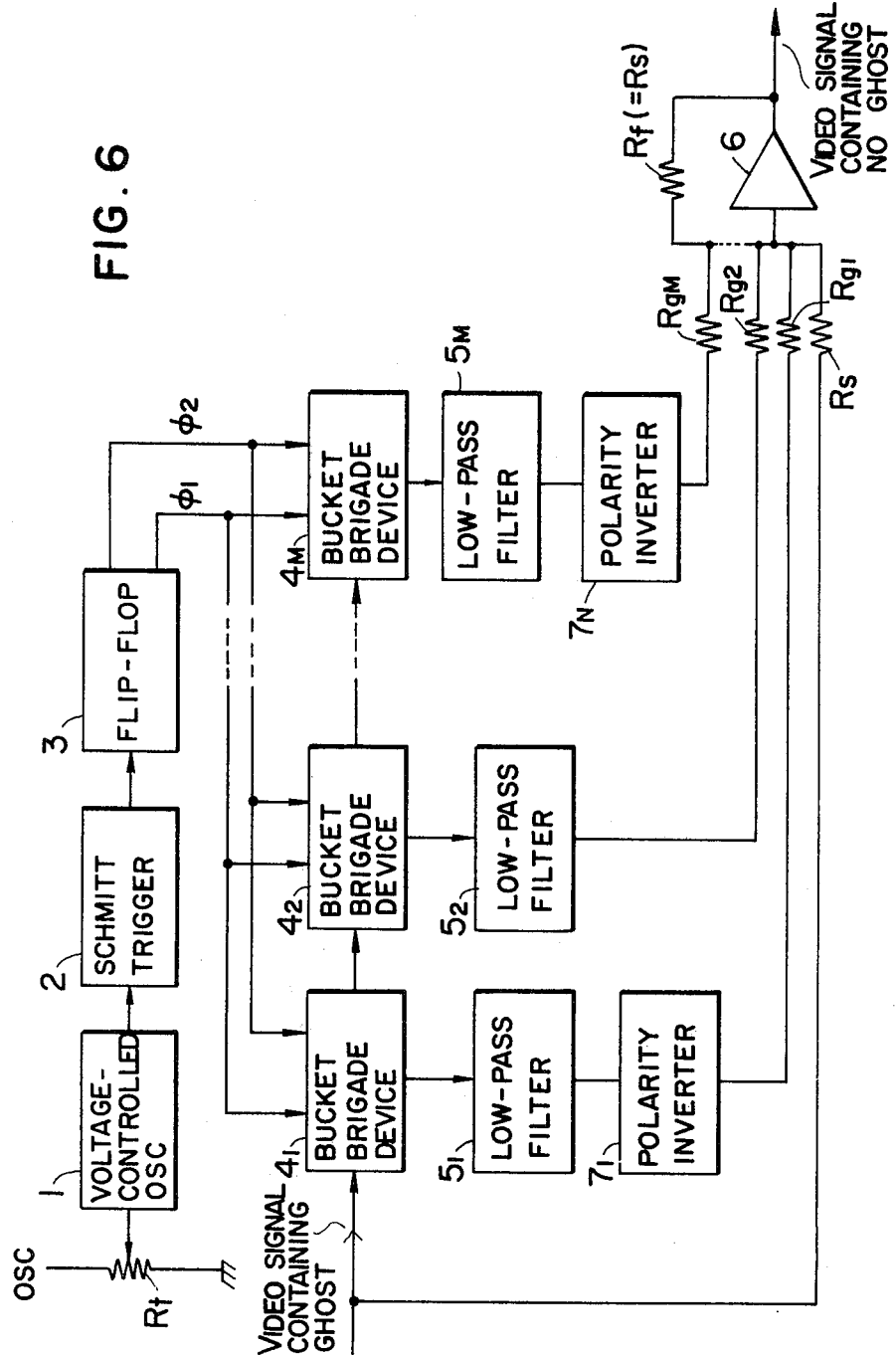
FIG. 6 is a block diagram of another embodiment to the system according to the present invention.

While, in the embodiment shown in FIG. 1, a weak ghost of negative polarity is produced at a position delayed by 2 $t_d$, the second embodiment shown in FIG. 6 illustrates an arrangement which eliminates such a ghost. In this figure, components which are designated as $R_t$, 1, 2, 3, 6, $R_f$ and $R_s$ correspond to those shown in FIG. 1. Numerals $4_1$ to $4_M$ designate bucket brigade devices. Numerals $5_1$ to $5_M$ designate low-pass filters of which odd numbered filters $5_1$, $5_3$, etc., are provided respectively with the succeeding polarity inverter circuits $7_1$ to $7_N$. Designated as $R_{g1}$ to $R_{gM}$ are adjusting resistors.

In this embodiment, the output of the bucket brigade device $4_1$ is serially supplied to the bucket brigade devices $4_2$ through $4_M$ which are of the identical construction as the bucket brigade device $4_1$, and the outputs of the bucket brigade devices $4_1$ to $4_N$ are supplied respectively to the low-pass filters $5_1$ to $5_M$. In other words, since the outputs of the respective bucket brigade devices have been previously sampled at the repetition frequency $f$ as mentioned earlier, the low-pass filters each thereof having a cut-off frequency falling between the values of $f$ and $f_{max}$ are connected to the output terminals of the respective bucket brigade devices to restore the original signal. The outputs of the odd number devices $4_1$, $4_3$, etc., are subjected respectively to the polarity reversal in the inverter circuits $7_1$ to $7_N$ and they are then supplied to the operational amplifier 6 which is an analog adder. The outputs of the filters $5_1$ to $5_M$ are applied to the operational amplifier 6 through the resistors $R_{g1}$ to $R_{gM}$ which determine their addition ratios so that they are added to the original video signal which is applied to the amplifier through the resistor $R_S$. The feedback resistor $R_f$ is provided as shown in FIG. 6. Assuming now that the intensity of the ghost component with respect to the principal signal (one including no ghost) in the original signal is given as $1/g$, that the values of $R_s$, $R_{g1}$, ....., $R_{gM}$ are selected so that $R_s/R_{g1} = 1/g$ and $R_{gK}/R_{gK+1} = 1/g$ (K = 1, 2, 3, ....., M - 1) and that the feedback resistor $R_f$ is selected to obtain $R_f = R_s$, then the output of the operational amplifier 6 approximates the video signal containing no ghost component. In other words, the analogical sum of the original signal and the output of the filter $5_1$ at the ratio 1 : $1/g$ contains the ghost having the delay time $2t_d$ and the intensity ratio $1/g^2$ and this ghost is cancelled by the analogical sum of the original signal and the output of the filler $5_2$ leaving the ghost having the delay time $3t_d$ and the intensity ratio $1/g^3$ which is in turn cancelled by virtue of the output of the filter $5_3$. A similar process is successively effected finally leaving the ghost having the delay time $(M + 1)t_d$ and intensity ratio $1/g$ (M +1). Consequently, if the value of M is selected so that the finally produced ghost becomes sufficiently weak, the video signal may result from which the ghost has been practically eliminated.

Figure 7:
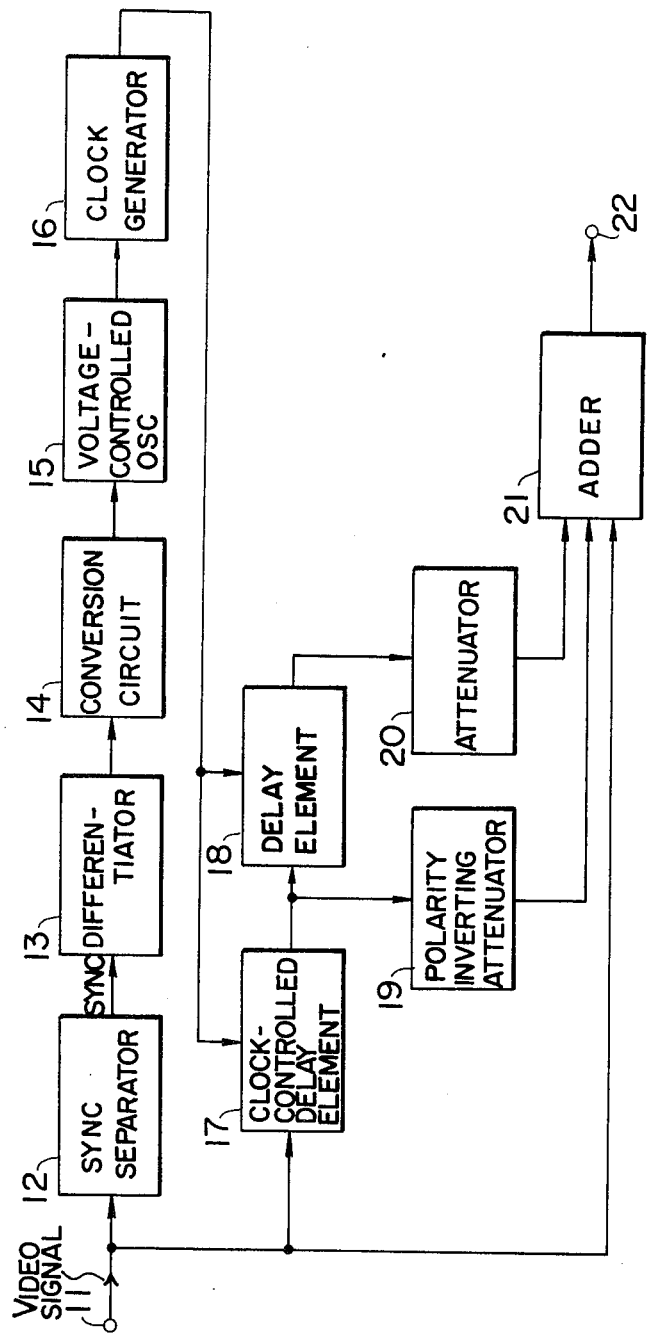
FIG. 7 is a block diagram of a further embodiment of the system according to the invention.

While, in the embodiments shown in FIGS. 1 and 6, the variable resistor $R_t$ has been manually adjusted to accomplish the cancellation of ghost, the embodiment shown in FIG. 7 illustrates an arrangement for accomplishing the cancellation of ghost automatically. In FIG. 7, numeral 11 designates an input terminal for a video signal containing a ghost signal, 12 a circuit for separating the synchronizing pulses from the video signal, 13 a circuit for differentiating the synchronizing pulse, 14 a conversion circuit for generating a DC voltage whose magnitide corresponds to the time interval of the differentiated pulses, 15 a voltage-controlled oscillator circuit for producing oscillations at a frequency corresponding to the applied DC voltage and having a characteristic whereby the oscillation frequency decreases at the DC voltage increases. Numeral 16 designates a circuit for receiving the output of the oscillator circuit 15 to generate two-phase clocks, three-phase clocks or the like to drive clock-controlled delay elements 17 and 18. Numeral 19 designates a circuit for inverting the polarity of the output of the delay element 17 and for attenuating this output by a predetermined amount, 20 a circuit for attenuating the output of the delay element 18 by a predetermined amount, 22 an output terminal where the video signal from which the ghost signal has been removed is delivered. The clock-controlled delay elements 17 and 18 may consist of the bucket brigade device shows in FIG. 3, for example.

Figure 8A:
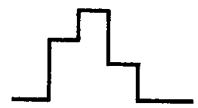
FIGS. 8A and 8B are signal waveform diagrams for the embodiment of FIG. 7.
Figure 8B:
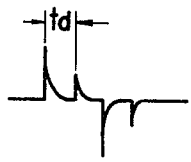

The embodiment of FIG. 7 operates as follows. When a video signal applied to the input terminal 11 contains a ghost signal, the sync separation circuit 12 produces an output as shown in FIG. 8A. This signal is differentiated in the differentiating circuit 13 which produces, as shown in FIG. 8B, two positive pulses and two negative pulses. The pulse interval $t_d$ between the positive pulses represents the delay time of the ghost. The conversion circuit 14 generates a voltage corresponding to the time interval $t_d$, thereby changing the oscillation frequency of the oscillator circuit 15. The output of this oscillator causes the circuit 16 to produce clock pulses for driving the delay elements 17 and 18. Since the video signal applied to the input terminal 11 has been applied to the delay element 17, the video signal delayed by the time $t_d$ is supplied to the polarity inverting attenuation circuit 19 where the polarity of the applied video signal is reversed and it is further attenuated by a suitable amount. Then the attenuated video signal is applied to the addition circuit 21 where it is added to the video signal applied to the input terminal to eliminate the ghost signal.

In this case, since the video signal applied to the delay element 17 contains the ghost signal, the final output produces a weak ghost of a negative polarity at a position delayed by $2t_d$. If the intensity of the ghost with respect to the principal signal in the input signal has been given as $1/g$, then the intensity of the ghost in the final output becomes $1/g^2$. Thus, if $1/g \leq 1/3$, then we obtain $1/g^2 \leq 1/9$ and this does not cause any inconvenience in practical use. However, if the intensity of the ghost exceeds this value, it produces some effect on the reproduced picture. The clock-controlled delay element 18 is provided to eliminate this effect. The delay time of the delay element 18 may be adjusted to correspond to that of the clock-controlled delay element 17 so that the intensity of the ghost in the final output is reduced to $1/g^3$.

If necessary, more delay elements may be connected in many stages.

To determine the amount of attenuation by the polarity inverting attenuator 19 and the attenuator 20, it is conceivable to use a method of manually adjusting attenuation or alternately a method of detecting the value of $1/g$ from the synchronizing pulses generated by the sync separation circuit 12 to thereby automatically adjust the attenuation.

FIG. 9 shows another embodiment in which the conversion circuit 14 in FIG. 7 is embodied in a more detailed arrangement.

In the figure, numeral 31 designates a sync separation circuit for separating the sync pulses from the video signal and supplying them to a differentiating circuit 32 and an integration type delay circuit 34. The differentiating circuit 32 differentiates a synchronizing signal A containing a ghost component and produces an output B. Numeral 33 designates a gating circuit for taking only the ghost component from the differentiated signal. The integration type delay circuit 34 delays the rising of the synchronizing signal by about 0.5 $\mu$ sec and operates a monostable multivibrator 35 by its output signal C, producing pulses D of 10 $\mu$ sec duration. These pulses D are used to open the gating circuit 33 and to actuate a Miller integrator circuit 36. Numeral 37 designates a sample hold circuit which samples an output F of the Miller integrator circuit 36 which an output pulse E of the gating circuit 33 and holds this voltage until the next sample pulse arrives.

Numeral 38 designates a voltage-controlled oscillator circuit whose oscillation frequency is determined by the control voltage applied from the sample hold circuit 37. Numeral 39 designates a Schmitt trigger circuit for reshaping the output of the oscillator circuit 38, 40 a flip-flop circuit for receiving the output of the Schmitt trigger circuit 39 to produce clock pulses $\phi_1$ and $\phi_2$ in two phases, 41 a bucket brigade device actuated by the two-phase clock pulses $\phi_1$ and $\phi_2$ to act as a variable delay device whose delay time depends on the repetition frequency of the clock pulses. Numeral 42 designates a low-pass inverting filter for effecting the polarity inversion and filtering of the unwanted higher harmonic components. Numeral 43 designates an operational amplifier externally provided with a variable resistor $R_g$ and resistors $R_s$ and $R_f$ to add the output of the filter 42 and the original video signal containing the ghost together analogically.

Figure 10:
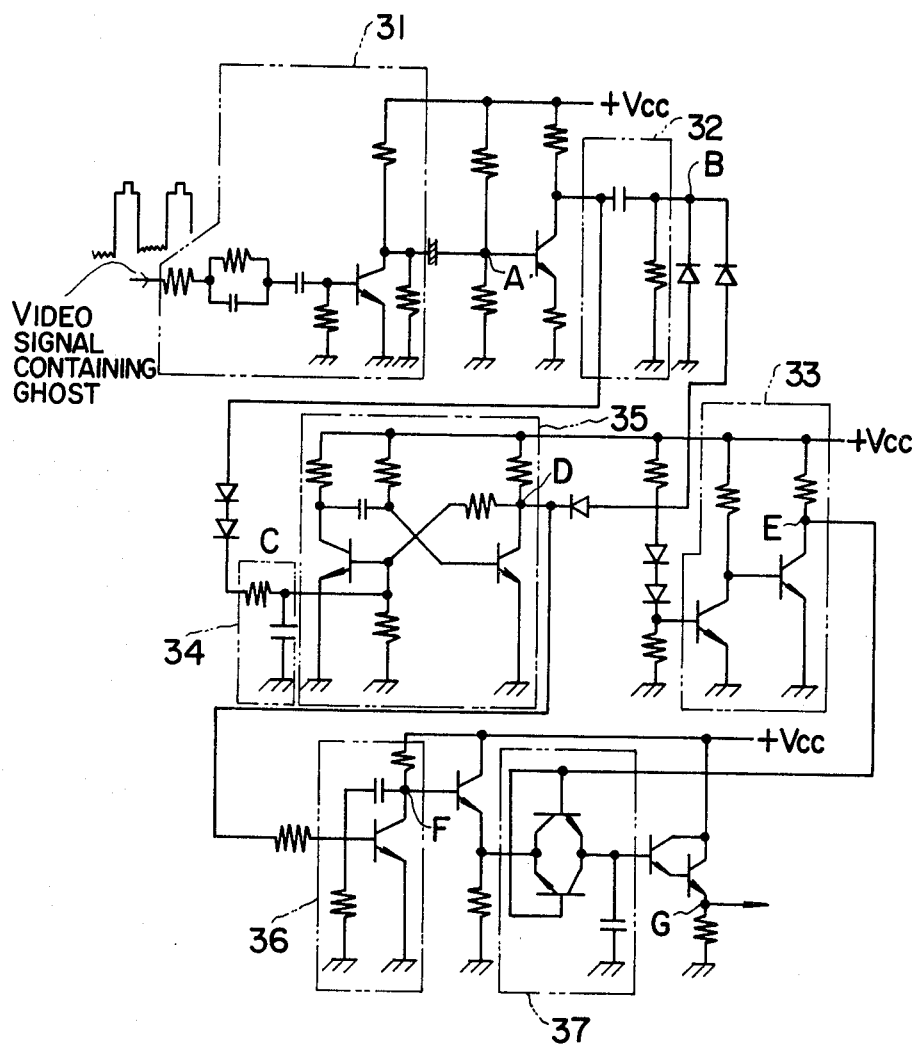
FIG. 10 is a specific circuit diagram for the principal part of the embodiment of FIG. 9.

FIG. 10 illustrates a detailed circuit construction of the component elements 31 through 37 shown in FIG. 9, and FIG. 11 illustrates the operating voltage waveforms for the circuits of FIGS. 9 and 10.

Figure 11A:
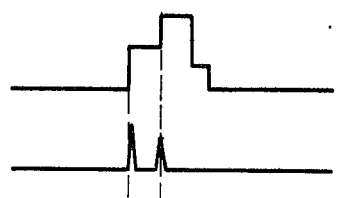
FIGS. 11A to 11G are signal waveform diagrams for the embodiment shown in FIG. 9.
Figure 11B:
Figure 11D:
Figure 11E:
Figure 11F:
Figure 11G:
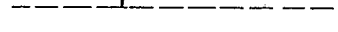

In the video signal containg the ghost component, the horizontal or vertical synchronizing signal consists of two synchronizing pulses of different magnitudes which are added together as shown in FIG. 11A. When this signal is differentiated and only positive pulses are taken, two closely spaced differentiated pulses are obtained as shown in FIG. 11B. On the other hand, a pulse C whose rise is delayed by about 0.5 $\mu$ sec from that of the signal of FIG. 11A, is applied to the monostable multivibrator 35 which produces a gating pulse D having a pulse width of about 10 $\mu$ sec. This gating pulse is used to open the gating circuit 33 so that only the differentiated pulse of the ghost component is extracted producing an output E. On the other hand, the Miller integrator circuit 36 is actuated by the output of the monostable multivibrator 35 producing an inverted trapezoidal waveform F. This waveform F is applied to the sample hold circuit 37 where it is sampled by the output E of the gating circuit 33 and this voltage is held and then delivered to the output. The voltage is shown in FIG. 11G. This output voltage $v$ is applied to the voltage-controlled oscillator circuit 38 to control its oscillation frequency. The oscillator output is reshaped by the Schmitt trigger circuit 39 and the flip-flop circuit 40, thus producing and supplying clock pulses $\phi_1$ and $\phi_2$ to the bucket brigade device 41.

On the other hand, the negative video signal containing the ghost is applied and delayed in the bucket brigade device 41.

Since the output of the bucket brigade device 41 has been sampled previously at the repetition frequency $f$ as mentioned earlier, it is necessary to provide a filter so that the original signal may be restored and then applied to an analog adder after reversing its polarity. These filtering and polarity reversing operations are performed by the low-pass inverting filter 42. The output of the filter 42 is applied through the variable resistor $R_g$ to the operational amplifier 43 where it is added to the video signal containing the ghost and applied through the resistor $R_s$. Let us assume that in the original signal, i.e., the video signal containing the ghost, the intensity of the ghost component with respect to the principal signal is $1/g$, that the values of $R_g$ and $R_s$ are selected so that $R_s/R_g = 1/g$ and that the feedback resistor $R_f$ is selected so that $R_f = R_s$, then the video signal from which the ghost component has been eliminated approximately is produced at the output of the operational amplifier 43. In this case, since the video signal applied to the bucket brigade device contains the ghost signal, the final output produces a weak ghost of negative polarity at a position delayed by $2t_d$. However, since the intensity of this ghost is $1/g^2$, if $1/g \leq 1/3$, then we obtain $1/g^2 \leq 1/9$. Thus, the intensity of the ghost is practically unnoticeable to the eye and it does not cause any inconvenience in practical use.

If the video signal does not contain any ghost component that can be detected, no ghost component appears in the waveform of FIG. 11B and hence no pulse E is produced. Therefore, $v = 0$ in FIG. 11G. Accordingly, if a switch which operates depending on whether $v > 0$ or not is connected in series with the resistor $R_g$ in FIG. 9, this circuitry may be used with video signals containing no ghost without any modification. In this case, if the delay time of the ghost is less than 0.5 $\mu$ sec, the system operates as if there were no ghost. The results of experiments showed that if the delay time of the ghost is less than 0.6 $\mu$ sec, the ghosst is not noticeable to the eye and thus the system can be used without any modification.

Figures 11C, 12:
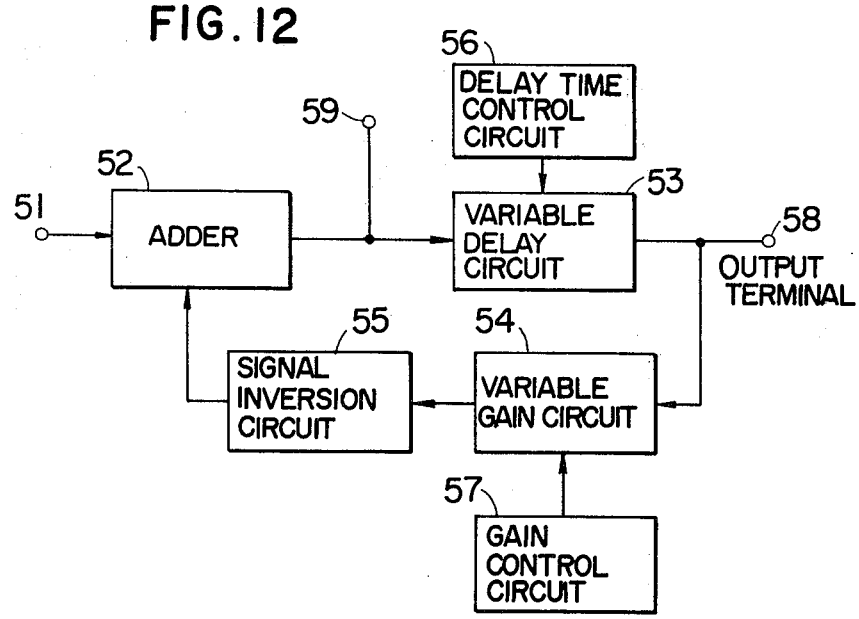
FIG. 12 is a block diagram of a still further embodiment of the system according to the invention.

FIG. 12 is still another embodiment of the ghost signal cancellation system which employs a feedback system to completely eliminate the ghost component.

In FIG. 12, numeral 51 designates an input terminal for a signal containing a ghost component, 52 an addition circuit where two signals are added together, 53 a variable delay circuit, 54 a variable gain circuit, 55 a signal inversion circuit, 56 a delay time control element, 57 a gain control element, 58 an output terminal for the signal from which the ghost component has been eliminated.

Figure 13A:
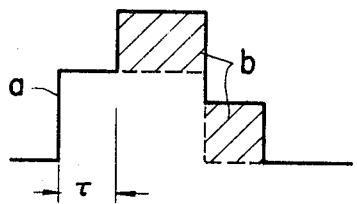
FIGS. 13A to 13F are signal waveform diagrams for the embodiment of FIG. 12.
Figure 13B:
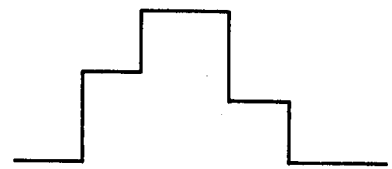
Figure 13C:
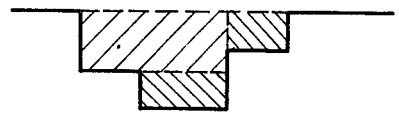
Figure 13D:
Figure 13E:
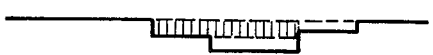
Figure 13F:

Assume now that a signal containing a ghost signal component $b$ delayed by a time $\tau$ a principal signal $a$ as shown in FIG. 13A is applied to the input terminal 51 and it is then applied to the variable delay circuit 53 through the addition circuit 52. The variable delay circuit 53 has been previously controlled by the delay time control element 56 so that its output is delayed by the time $\tau$ with respect to the principal signal $a$ as shown by the waveform of FIG. 13B. The output signal of the delay circuit 53 is applied to the variable gain circuit 54 where the gain is controlled by the gain control element 57 to the magnitude of the ghost component $b$ in the waveform of FIG. 13A. The signal is then passed through the signal inversion circuit 55, with the result that the waveform of FIG. 13C is produced and then applied to the addition circuit 52. Similarly, for the waveform of FIG. 13C, the waveform of FIG. 13D is fed back, and the waveform of FIG. 13E is fed back for the waveform of FIG. 13D. Assuming that all of these waveforms have been fed back and combined, the waveform of FIG. 13F is produced at the output terminal 58 producing an overcompensation by a component C. In practice, however, the feedback is accomplished infinitely and thus the ghost component is completely compensated.

In other words, in this system the overcompensation caused by the cancellation produces a further ghost at a position delayed by two times compared with the ghost component. Thus, the feedback is effected repeatedly to completely compensate the undesired signals.

In place of the output terminal provided at 58 in FIG. 12, the output terminal may be provided at the junction point of the addition circuit 52 and the variable delay circuit 53 as at 59 in FIG. 12.

If many ghost signal components are included in the video signal, the same number of the above-mentioned circuitry of FIG. 12 may be connected in series so that the ghost signal components are eliminated one at each stage. In this way, the ghost signal components can be completely eliminated to obtain the principal video signal from which the ghost signal components have been completely eliminated.

FIG. 14 illustrates an example of circuitry embodying the reception system of FIG. 12. In the figure, transistors 60 and 61 constitute the addition circuit, the variable delay circuit is embodied in inductances 62 through 65 and variable capacitance diodes 66 through 69, and the variable gain circuit and the inversion circuit are respectively embodied in a transistor 70 and a variable resistor 71. Particularly, since the ghost signal component may not necessarily be of the same polarity with the principal video signal, the inversion circuit is designed to change the polarity of the ghost component from positive to negative, or vice versa.

The variable delay circuit 53 may also consist of a change coupled device, bucket brigade device or the like.

Figure 15:
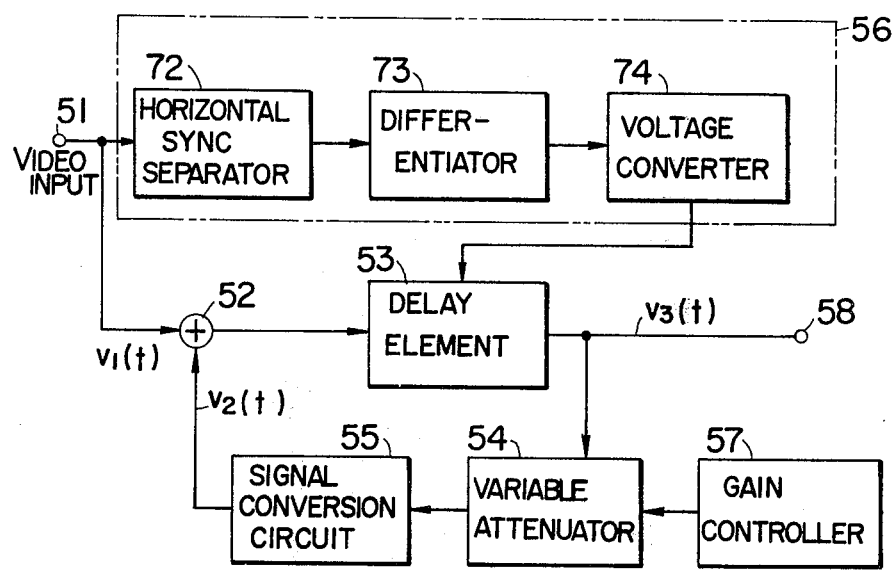
FIG. 15 is a block diagram of a still further embodiment of the system according to the present invention.

FIG. 15 is still another embodiment of the invention. The embodiment of FIG. 15 differs from the embodiment of FIG. 12 in that the delay time of the variable delay circuit 53 is automatically controlled. In FIG. 15, those components corresponding to the blocks shown in FIG. 12 are designated by the identical reference numerals.

Figure 16A:
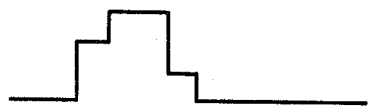
FIGS. 16A to 16D are waveform diagrams of the signals at various portions of the embodiment of FIG. 15.
Figure 16B:
Figure 16C:
Figure 16D:

In operation, a video signal applied to the input terminal 51 is subjected to the sync separation in a horizontal sync separation circuit 72, producing the horizontal synchronizing pulse containing the ghost as shown in FIG. 16A. This synchronizing pulse is differentiated in a differentiating circuit 73, producing a signal as shown in FIG. 16D. This signal is then converted in a conversion circuit 74 into a voltage in accordance with the value of delay time $\tau$. The voltage thus obtained is applied to a delay element 53 to thereby control its delay time.

Figure 17:
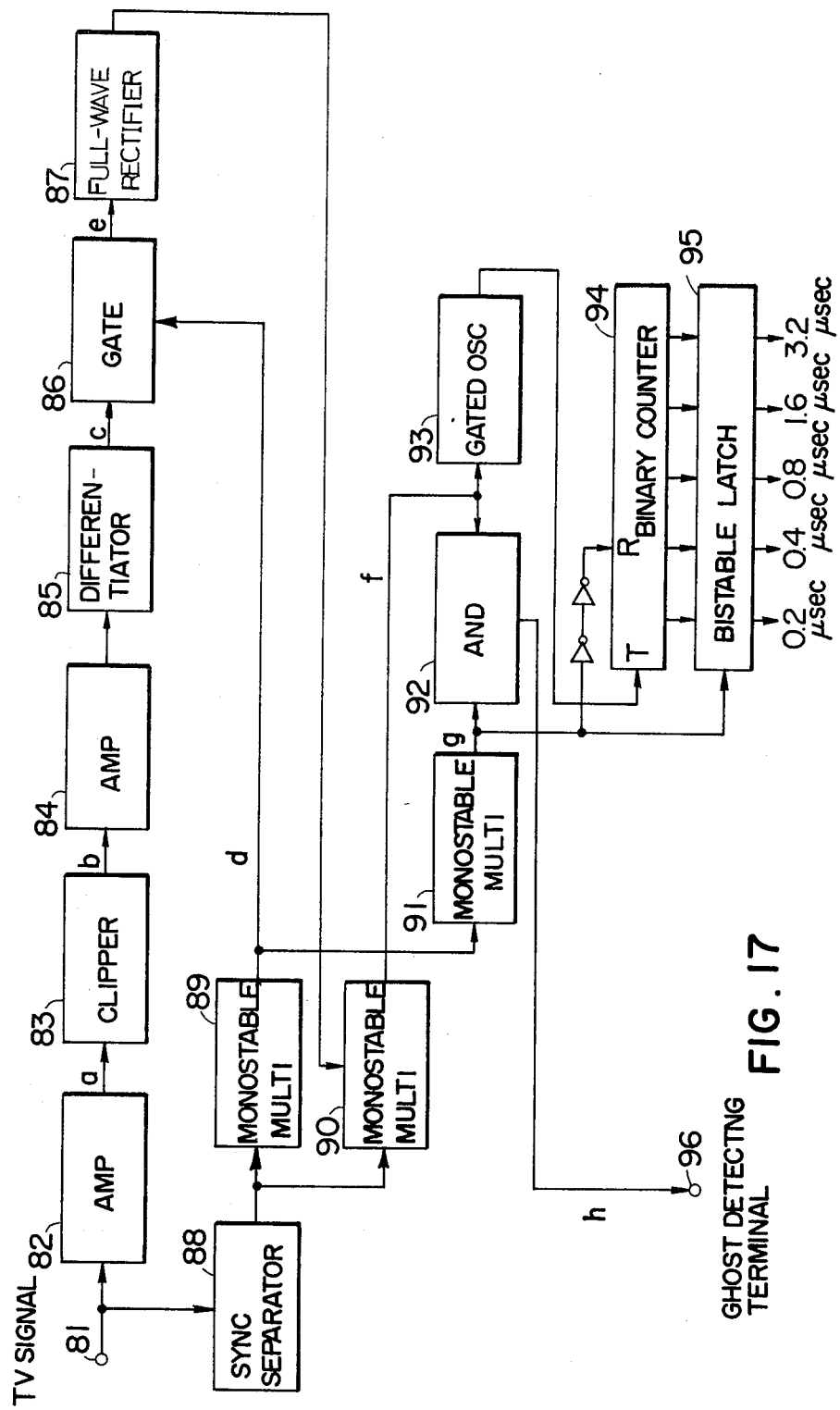
FIG. 17 is a block diagram of a detector for detecting the time interval of ghost signals.

Referring now to FIG. 17, a ghost signal time interval detector for generating signals which may be utilized to control for example the variable delay circuit shown in FIG. 14 or to display the delay time of ghosts on a cathode ray tube or the like, will be explained. In the actual television signals, the time interval of the ghosts mostly falls between zero $\mu$ sec and several $\mu$ sec, whereas the horizontal synchronizing pulse width of the television signal is about 5 $\mu$ sec. Thus, by utilizing this fact, it is possible to detect the time interval of the ghosts.

In FIG. 17, numeral 81 designates an input terminal for the television signal which has been subjected to the video detection, 82 an amplifier circuit, 83 a clipper, 84 an amplifier circuit, 85 a differentiating circuit. Numeral 86 designates a gate for deriving only the necessary information from the output of the differentiating circuit 85, 87 a full-wave rectifier circuit. Numeral 88 designates a sync separation circuit, 89 a monostable multivibrator actuated by the leading edge of the output pulse of the sync separation circuit 88 and having an output pulse width of 4.5 $\mu$ sec, 90 a resettable monostable multivibrator actuated by the leading edge of the output pulse of the sync separation circuit 88 and resettable by the output pulse of the rectifier circuit 87. Numeral 91 designates a monostable multivibrator actuated by the trailing edge of the output pulse from the monostable multivibrator 89 and having an output pulse width of 3.5 $\mu$ sec, 92 and AND circuit for performing the AND operation on the output of the multivibrator 91 and the output of the multivibrator 90, 96 a ghost detecting terminal for producing an output pulse when there is no ghost in the signal applied to the input terminal 81. Numeral 93 designates a gated oscillator controlled by the output of the multivibrator 90 and having a frequency of 5 MHz, 94 a binary counter for counting the number of output pulses from the oscillator 93 for every H. Numeral 95 designates a bistable latch for storing the output of the counter 94 for every H and capable of indicating the time interval of the ghost ranging from 0 $\mu$ sec to 4.4 $\mu$ sec with a pitch of 0.2 $\mu$ sec.

FIGS. 18 and 19 show the signal waveforms developed by the principal components in the block diagram of FIG. 17. FIG. 18 shows the case where the ghost signal is included in the television signal, while FIG. 19 shows the case where no ghost signal is included in the television signal. In FIGS. 18 and 19, the signal waveforms designated by reference symbols $a$ through $h$ correspond to the signal waveforms on the lines designated by the identical reference symbols in FIG. 17.

The operation of the embodiment shown in FIG. 17 will now be explained. The operation of the embodiment will be first explained for the case where the ghost signal is contained in the signal applied to the input terminal 81. The output signal from the amplifier circuit 82 contains the picture signal, burst signal, synchronizing signal and so on as shown in FIG. 18A. This output signal is processed in the clipper 83, transmitting only the synchronizing signal as shown in FIG. 18B. In the differentiating circuit 85, the synchronizing signal is differentiated producing the signal of FIG. 18C. On the other hand, the monostable multivibrator 89 is actuated by the synchronizing signal separated in the sync separation circuit 88 from the signal applied to the input terminal 81, producing the signal of FIG. 18D. The output of the multivibrator 89 is used as gating signal, whereby the gate 86 produces the pulse shown in FIG. 18E. The multivibrator 90 is set by the output of the sync separation circuit 88 and reset by the output of the rectifier circuit 87, producing the output shown in FIG. 18F during which interval the oscillator 93 is caused to produce oscillations. The multivibrator 91 actuated by the output of the multivibrator 89 produces the output shown in FIG. 18G, whereby the AND circuit 92 produces no output pulse as shown in FIG. 18H. The counter 94 counts the number of pulses generated from the oscillator 93 and actuates the bistable latch 95 causing it to indicate the delay time.

On the other hand, when the signal of FIG. 19A containing no ghost is applied to the input terminal 81, contrary to the case of the signal containing the ghost which has been described with reference to FIG. 18, the output pulse width of the multivibrator 90 is widened as shown in FIG. 19F, whereby the AND circuit 92 produces the pulse shown in FIG. 19H, indicating the absence of ghost in the signal.

Figure 20:
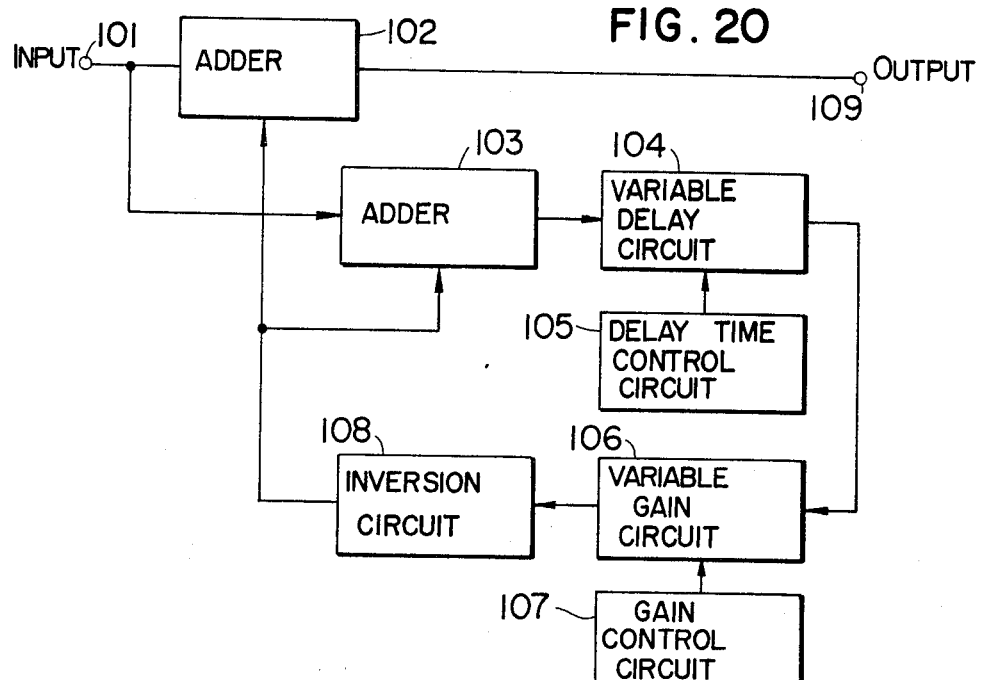
FIG. 20 is a block diagram of a still further embodiment of the system according to the invention.

FIG. 20 is still another embodiment of the ghost signal cancellation system of the invention. In FIG. 20, numeral 101 designates an input terminal for a signal containing a ghost signal component, 102 an addition circuit where the signal applied to the input terminal 101 and a signal for cancelling the ghost signal component are added together, 103 an addition circuit for producing the signal which cancels the ghost signal, 104 a variable delay circuit actuated by a delay time control circuit 105 and having a delay time equivalent to the delay time of the ghost signal, 106 a variable gain circuit actuated by a gain control circuit 107, 108 an inversion circuit for feeding back the signal whose delay time and gain have been adjusted, 109 an output for the signal from which the ghost signal has been eliminated.

Figure 21A:
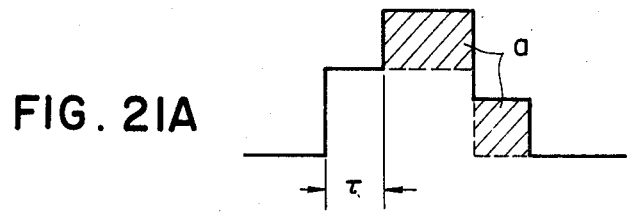
FIGS. 21A to 21G are signal waveform diagrams for the embodiment of FIG. 20.
Figure 21B:
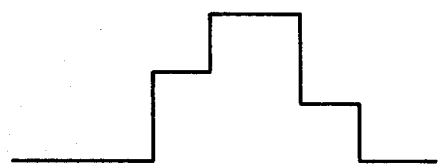
Figure 21C:
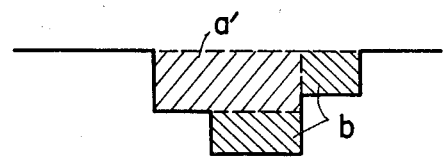
Figure 21D:
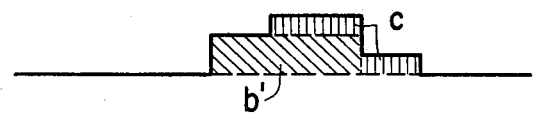
Figure 21E:
Figure 21F:
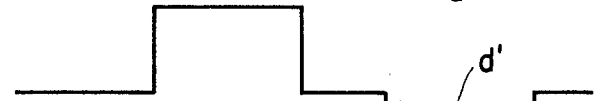
Figure 21G:
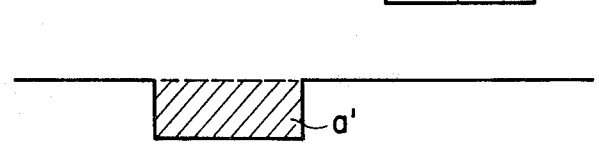

In operation, when the signal of FIG. 21A containing the ghost component $a$ is applied to the input terminal 101, if no feedback is effected through the inversion circuit 108, the signal shown in FIG. 21B is generated from the variable delay circuit 104 with a delay corresponding to the delay time $\tau$ of the ghost signal. This output signal is adjusted to the same magnitude as the ghost component $a$ in the variable gain circuit 106 and it is then inverted producing the signal shown in FIG. 21C, which is applied to the addition circuit 103. In like manner, the signal having the waveform shown in FIG. 21D is fed back for the signal waveform of FIG. 21C, and the signal having the waveform shown in FIG. 21E is fed back for the signal waveform of FIG. 21D. Assuming that the signal waveforms shown in FIGS. 21A, 21C, 21D and 21E have been fed back and added together, the signal with the waveform shown in FIG. 21F is produced as the output of the variable delay circuit 104. Although this signal waveform still retains the undesired component $d'$, in effect this component $d'$, can also be eliminated, since the feedback is repeated infinitely. Consequently, the output of the inversion circuit 108 takes the signal waveform shown in FIG. 21G. Since this waveform is the same as that of the ghost component $a$ but of the opposite polarity, it is added to the signal of FIG. 21A in the addition circuit 102, whereby the signal from which the ghost component has been completely eliminated is produced at the output terminal 109. In this case, while the ghost signal component has been completely eliminated from the signal shown in FIG. 21F, its signal-noise ratio has been deteriorated due to the repeated feedback. For this reason, this signal is specially added to the signal containing the ghost signal component, thereby producing the signal cleared of the ghost signal.

FIG. 22 illustrates a specific circuit diagram corresponding to the embodiment shown in FIG. 20. In the figure, numeral 110 designates an input terminal at which is applied a signal containing a ghost signal component, 111 and 112 transistors forming an addition circuit, 113 through 115 and 116 through 119 inductances and variable capacity elements constituting a variable delay circuit, 120 a transistor corresponding to the variable gain circuit 106 and the inversion circuit 108 shown in FIG. 20, 121 and 122 transistors constituting an addition circuit.

In operation, when a signal containing a ghost signal component is applied to the input terminal 110, the signal is passed to the variable delay circuit through the transistor 111. Here, a suitable voltage is applied to the variable capacity elements 116 through 119 corresponding to the delay time control circuit 105, thereby delaying the signal by a time equivalent to the delay time of the ghost signal. The signal, whose gain and polarity were adjusted by the transistor 120, is fed back to the transistor 112 and it is also applied to the transistor 121. Generally, the ghost signal component may not always have the same polarity as the principal video signal and therefore it is essential that the amount of feedback can be adjusted with either a positive or negative polarity. On the other hand, the original signal containing the ghost signal component is applied to the transistor 122 where it is added to the signal applied to the transistor 121, i.e., the signal for eliminating the ghost signal, thereby producing the signal cleared of the ghost signal at the output terminal 123.

While the construction and operation of this embodiment have been described for the case where the input signal contains the signal ghost signal component, an input signal containing a large number of ghost signal components may also be eliminated by providing as many groups of the individual circuits shown in FIG. 20 excepting the addition circuit 102, so that a signal for eliminating the respective ghost signal components may be produced by each groups of the circuit and applied to the addition circuit 102 in parallel.

Figure 23:
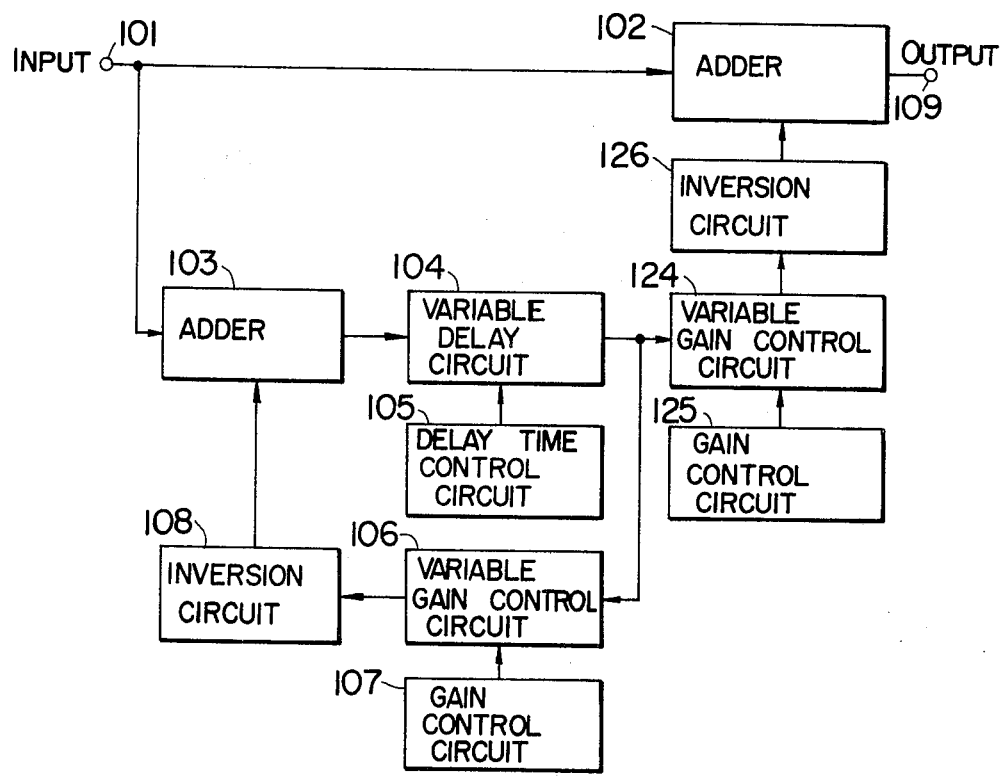
FIG. 23 is a block diagram of a still further embodiment of the system according to the invention.

FIG. 23 is still another embodiment of the invention, which is a modification of the embodiment shown in FIG. 20. In the description of this embodiment, reference will be made to a part of FIG. 21.

In FIG. 23, numeral 101 designates an input terminal at which is applied a signal containing a ghost signal component, 102 an addition circuit where the signal applied to the input terminal and a signal for cancelling the ghost signal are added together, 103 an addition circuit for producing the ghost signal cancelling signal, 104 a variable delay circuit driven by a delay time control circuit 105 and having a delay time equivalent to the delay time of the ghost signal, 106 a variable gain circuit driven by a gain control circuit 107, 108 an inversion circuit for feeding back the signal having the adjusted delay time and gain, 124 a variable gain circuit for adjusting the magnitude of the ghost signal cancellation signal with a gain control circuit 125, 126 an inversion circuit for inverting the output signal from the variable gain control 124, 109 an output for the signal cleared of the ghost signal.

In operation, when the signal of FIG. 21A containing the ghost component *a* is received at the input terminal 101, if there is not feedback through the inversion circuit 108, the variable delay circuit 104 produces at its output the signal shown in FIG. 21B with a delay corresponding to the delay time of the ghost signal. This signal, adjusted to the magnitude of the ghost component *a* in the variable gain circuit 106 and inverted in the inversion circuit 108, produces the signal shown in FIG. 21C which is applied to the addition circuit 103. Similarly, the signal having the waveform shown in FIG. 21D is fed back for the signal waveform of FIG. 21C, and the signal having the waveform shown in FIG. 21E is fed back for the signal waveform of FIG. 21D. Assuming that in this manner the signals having the waveforms shown in FIGS. A, C, D and E have all been fed back and added together, the signal shown in FIG. 21F is produced at the output of the variable delay circuit 104. While this signal waveform still retains an unwanted component $d'$, in effect this component $d'$, can also be eliminated, since the feedback is repeated infinitely. The signal shown in FIG. 21F is passed through the variable gain circuit 124 and the inversion circuit 126 so that the signal having the same magnitude as the ghost component *a* in FIG. 21A and the inverted polarity is then applied to the addition circuit 102, thereby producing the signal completely cleared of the ghost signal component at the output terminal 109. In this case, while the signal of FIG. 21F has been cleared of the ghost signal component, its signal-noise ratio has been deteriorated due to the repeated feedback processing. Therefore, the signal of FIG. 21F is specially added to the signal containing the ghost signal component, thereby producing the signal having a good signal-noise ratio and cleared of the ghost signal component.

Figure 24:
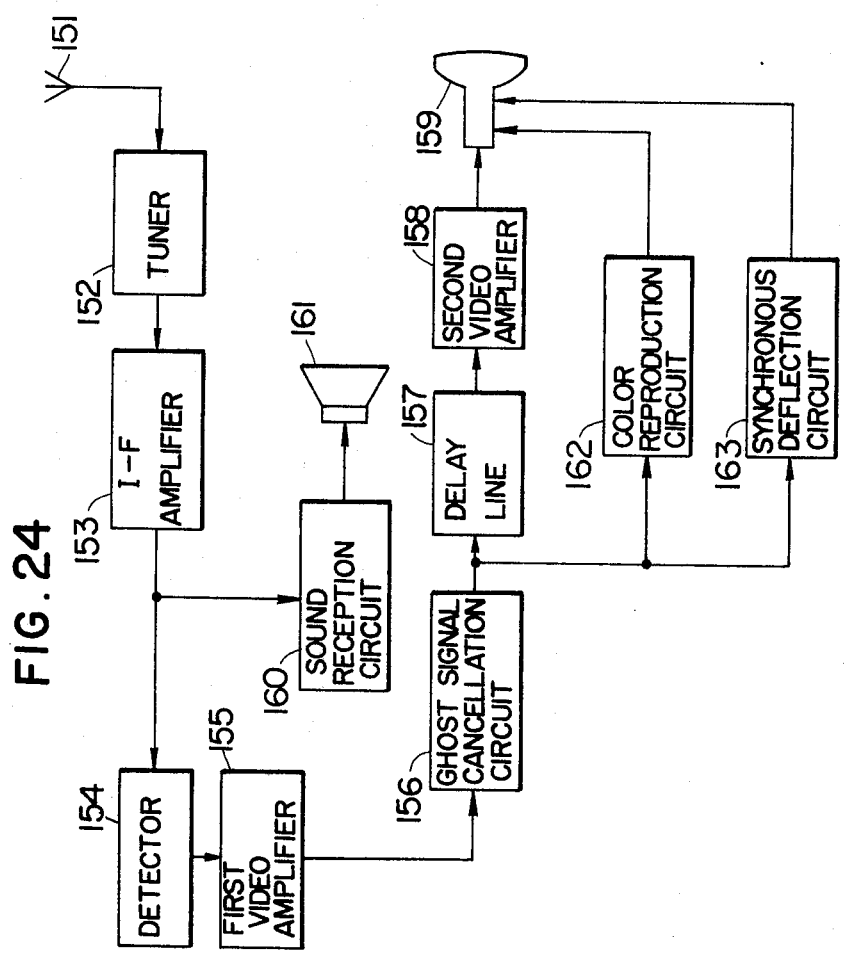
FIG. 24 is a block diagram of a television receiver embodying the present invention.

FIG. 24 illustrates the construction of a television receiver incorporating the ghost signal cancellation system of this invention.

In the figure, numeral 151 designates an antenna, 152 a tuner used for high frequency amplification and frequency conversion, 153 an intermediate frequency amplifier circuit, 154 a detector circuit, 155 a first video amplifier circuit, 156 a ghost signal cancellation circuit which may be any one of the embodiments described hereinbefore, 157 a delay line, 158 a second video amplifier, 159 a cathode ray tube, 160 a sound reception circuit, 161 a speaker, 162 a color reproducing circuit, 163 a synchronous deflection circuit.

In this receiver, the video signal detected by the detector circuit 154 is amplified in the amplifier circuit 155 and then applied to the ghost signal cancellation circuit 156 where the ghost signal is removed. The video signal thus cleared of the ghost signal is subjected to the same signal processing as in an ordinary color television receiver, whereby the picture from which the ghost has been eliminated is displayed on the cathode ray tube 159.

What we claim is:

1. A ghost signal cancellation system comprising:
    means for receiving a signal transmitted from transmitting means;
    delay means for providing a predetermined delay time, said delay means including a clock-controlled delay device;
    delay time control means for setting a delay time of said delay means to a given value in accordance with the delay time of a ghost signal contained in said received signal, said delay time control means including an oscillator having a variable oscillation frequency and means for supplying an output of said oscillator to said delay device as clock signals;
    means for receiving an output of said delay means and controlling a gain of said output in accordance with a level of said ghost signal;
    means for subtracting said gain-controlled signal from said received signal, and
    means for feeding back an output of said subtracting means to said delay means, wherein an output of said gain control means is further substracted from the received signal in a secondary subtraction circuit to produce a system output signal.

2. A ghost signal cancellation system comprising:
    delay means for receiving a signal transmitted from transmitting means and delaying said received signal by a time corresponding to a delay time of a ghost signal contained in said received signal, said delay means including a clock-controlled delay circuit;

delay time control means for setting the delay time of said delay means to a given value, said delay time control means including means for separating synchronizing pulses contained in said received signal and means for detecting a time delay between a normal one of said separated synchronizing pulses and an abnormal one of said separated synchronizing pulses contained in said ghost signal, whereby the delay time of said delay means is controlled by an output of said detecting means to be equal to said detected time delay, and wherein said time delay detecting means includes a circuit for differentiating said separated synchronizing pulses, a circuit triggered by a differentiated pulse derived from the normal synchronizing pulse to generate a ramp voltage, a circuit for sampling said ramp voltage by a differentiated pulse derived from the abnormal synchronizing pulse contained in the ghost signal, and a circuit for holding said sampled voltage until a next sampling time;

an oscillator whose oscillation frequency is changed by an output of said hold circuit, whereby said clock-controlled delay circuit is driven by the output of said oscillator;

means for receiving an output of said delay means and controlling a gain of said output in accordance with a level of said signal; and means for subtracting said gain-controlled output from said received signal.

3. A ghost signal cancellation system comprising:

means for receiving a signal transmitted from transmitting means;

delay means for providing a predetermined delay time, said delay means including a clock-controlled delay device;

delay time control means for setting a delay time of said delay means to a given value in accordance with the delay time of a ghost signal contained in said received signal, said delay time control means including an oscillator having a variable oscillation frequency and means for supplying an output of said oscillator to said delay device as clock signals;

means for receiving an output of said delay means and controlling a gain of said output in accordance with a level of said ghost signal;

means for subtracting said gain-controlled signal from said received signal, and means for feeding back an output of said subtracting means to said delay means, wherein an output of said delay means is further subtracted from the received signal in a secondary subtraction circuit to produce a system output signal.

4. A ghost signal cancellation system comprising:

a delay means for receiving a signal transmitted from transmitting means and delaying said received signal by a time corresponding to a delay time of a ghost signal contained in said received signal, said delay means including a clock-controlled delay device;

delay time control means for setting the delay time of said delay means to a given value, said delay time control means including an oscillator having a variable oscillation frequency, means for supplying an output of said oscillator to said delay device as clock signals, and means for separating synchronizing pulses contained in the received signal; means for differentiating said separated synchronizing pulse, gating means for deriving the differentiated abnormal synchronizing pulse attributable only to the ghost signal, an oscillator capable of being set by a rising portion of said synchronizing pulse and reset by an output of said gating means to produce pulses having a variable pulse width, a gated oscillator having an oscillation period controlled by an output pulse of said oscillator, a counter for counting an output of said gated oscillator, and a latch circuit for storing an output of said counter and for producing an output in the form of a binary code signal, whereby the delay time of said means is controlled by the output of said latch circuit;

means for receiving an output of said delay means and controlling a gain of said output in accordance with a level of said ghost signal; and means for subtracting said gain-controlled output from said received signal.

5. A ghost signal cancellation system comprising:

means for receiving a signal transmitted from transmitting means;

delay means for providing a predetermined delay time, said delay means including a clock-controlled delay device;

delay time control means for setting a delay time of said delay means to a given value in accordance with the delay time of a ghost signal contained in said received signal, said delay time control means including an oscillator having a variable oscillation frequency, means for supplying an output of said oscillator to said delay device as clock signals, means for separating synchronizing pulses contained in the received signal, means for differentiating said separated synchronizing pulses, gating means for deriving the differentiated abnormal synchronizing pulse attributable only to the ghost signal, an oscillator capable of being set by a rising portion of said synchronizing pulse and reset by an output of said gating means to produce pulses having a variable pulse width, a gated oscillator having an oscillation period controlled by an output pulse of said oscillator, a counter for counting an output of said gated oscillator, and a latch circuit for storing an output of said counter and for producing an output in the form of a binary code signal, whereby the delay time of said delay means is controlled by an output of said latch circuit;

means for receiving an output of said delay means and controlling a gain of said output in accordance with a level of said ghost signal;

means for subtracting said gain-controlled signal from said received signal, and means for feeding back an output of said subtracting means to said delay means.

* * * * *